United States Patent [19]

Fletcher et al.

[11] 3,737,776

[45] June 5, 1973

[54] TWO CARRIER COMMUNICATION SYSTEM WITH SINGLE TRANSMITTER

[76] Inventors: James C. Fletcher, Administrator of the National Aeronautics and Space Administration with respect to an invention of; Mahlon F. Easterling, 106 Marcheta St., Altadena, Calif. 91001

[22] Filed: June 9, 1971

[21] Appl. No.: 151,411

[52] U.S. Cl. ..............325/40, 179/15 A, 179/15 BM, 343/204

[51] Int. Cl. ..............H04j 3/00

[58] Field of Search ..............325/46, 65, 156, 325/158, 48, 40, 56; 343/203, 207, 204; 179/15 A, 15 BM; 178/67

[56] References Cited

UNITED STATES PATENTS

| | | | |
|---|---|---|---|
| 3,310,742 | 3/1967 | Adams | 343/204 |
| 2,481,516 | 9/1949 | Jacobsen | 179/15 BM |
| 3,502,809 | 3/1970 | Dickey | 178/67 |
| 3,305,636 | 2/1967 | Webb | 178/67 |
| 2,104,011 | 1/1938 | Armstrong | 325/48 |

*Primary Examiner*—Robert L. Griffin
*Assistant Examiner*—William T. Ellis
*Attorney*—Monte F. Mott, Paul F. McCall and John R. Manning

[57] ABSTRACT

A pulse-code modulated communication system is disclosed for transmitting two subcarrier-modulated carriers from a single transmitter comprising two channels for phase modulating the two carriers independently. The modulating subcarriers are independently modulated by data and/or pseudonoise (PN) codes as desired. The modulated carriers are switched alternately to the single transmitter in synchronism with operation of a PN code generator when PN code modulation is present, as for ranging.

2 Claims, 2 Drawing Figures

INVENTOR.
MAHLON F. EASTERLING
BY Paul F. McCaul
Monte F. Mott
ATTORNEYS.

Patented June 5, 1973

3,737,776

2 Sheets-Sheet 2

INVENTOR.
MAHLON F. EASTERLING
BY
Monte F. Mott
Paul F. McCaul
ATTORNEYS.

TWO CARRIER COMMUNICATION SYSTEM WITH SINGLE TRANSMITTER

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to a multicarrier communications system, and more particularly to a system for transmitting two or more modulated signals from a single transmitter.

During space exploration missions, it is often necessary to transmit signals to two spacecraft simultaneously, such as during a mission involving one spacecraft or command module orbiting a planet and a second spacecraft or lander which leaves the orbiting spacecraft and lands on the planet.

One method of doing this which has been proposed is to linearly add two carriers modulated by the separate signals to be transmitted, and use the sum to drive a transmitter. However, the electron tube used to amplify or generate radio waves of microwave range frequencies by means of velocity modulation, called a klystron, exhibits nonlinearity when operating at near capacity, as do traveling wave tubes. This nonlinearity creates problems of intermodulation products which may enter the input sections of the receivers. Therefore, to reduce the effects of nonlinearity, the tube must be operated at reduced output power. Moreover, the tube is operating in an unintended mode and its characteristics in this mode are not controlled in its design. Even if controlled, its characteristics may vary with time, with small changes in operating conditions and from tube to tube. In any event, the major objection to this method is the use of the transmitter with an efficiency of perhaps 20 percent.

Another method which has been proposed is to use the same carrier frequency, but different subcarrier frequencies for the different receiving stations. The transmitter could then run at full power. The only power loss would be in intermodulation products between the two subcarriers. These intermodulation products are different in kind from those formed by adding two separate carriers. First, they fall within the transmitter band; second, they are precisely controlled and do not depend on unknown tube characteristics. However, the use of a single carrier frequency for the several receiving stations is a severe restriction. It would be desirable to employ a method which permits the transmitter to run at full power without the restriction of a single carrier frequency.

One method which has bee proposed for obtaining two separate phase modulated carriers $F_1$ and $F_2$ from a transmitter in a way that is both more efficient and better controlled than merely adding the two carriers and operating the transmitter at less than full power, is to modulate a carrier at frequency $F_3$ by a square wave $F_s$ such that $F_3$ equals $F_1$ plus $F_2$ divided by two and $F_s$ equals $F_2$ minus $F_1$ divided by two. If the modulation is selected to suppress the carrier, the power in the first two sidebands combined is down about 0.9 db from the total power, and each is down by 3.9 db, leaving two carriers $F_1$ and $F_2$.

These two carriers can be modulated for communication by using a separate squarewave subcarrier for each with the frequencies chosen to produce non-interfering spectra when both are on the same carrier. This is done by biphase modulating the two subcarriers, adding the modulated subcarriers and using the sum to phase modulate the carrier $F_3$ before it is biphase modulated by the squarewave $F_s$. However, this method requires simultaneous adjustment of both frequencies $F_3$ and $F_s$ to change the frequency of one of the carriers without changing the other. Such a task is very difficult for an operator. It would be desirable to employ a method which permits transmitting two, or more, carriers at full power with the selection of the carrier frequencies completely independent of each other.

SUMMARY OF THE INVENTION

In accordance with the present invention, a plurality of carriers, each at a frequency independent of the others, are separately phase modulated by suitable means and coupled to a common transmitter by suitable switching means while the transmitter is operating continuously at full power. Each carrier can be phase modulated by a subcarrier which is in turn modulated by pulse code data. The switching rate is selected to be high compared to any of the subcarrier frequencies in order for switching sidebands to be significantly displaced from the carrier frequencies in the power spectrum of switched carriers.

As a further feature in space communications, ranging may be accomplished with one or more receiving stations by modulating the subcarriers with a pseudonoise (PN) code at a given rate and selecting that rate for the switching rate. After several sequences of the PN code on a given subcarrier, i.e., of the carrier modulated by that subcarrier, a receiver can effect normal correlation with the PN code in the usual manner for ranging.

DESCRIPTION OF THE PREFERRED EMBODIMENT

Figure 1:
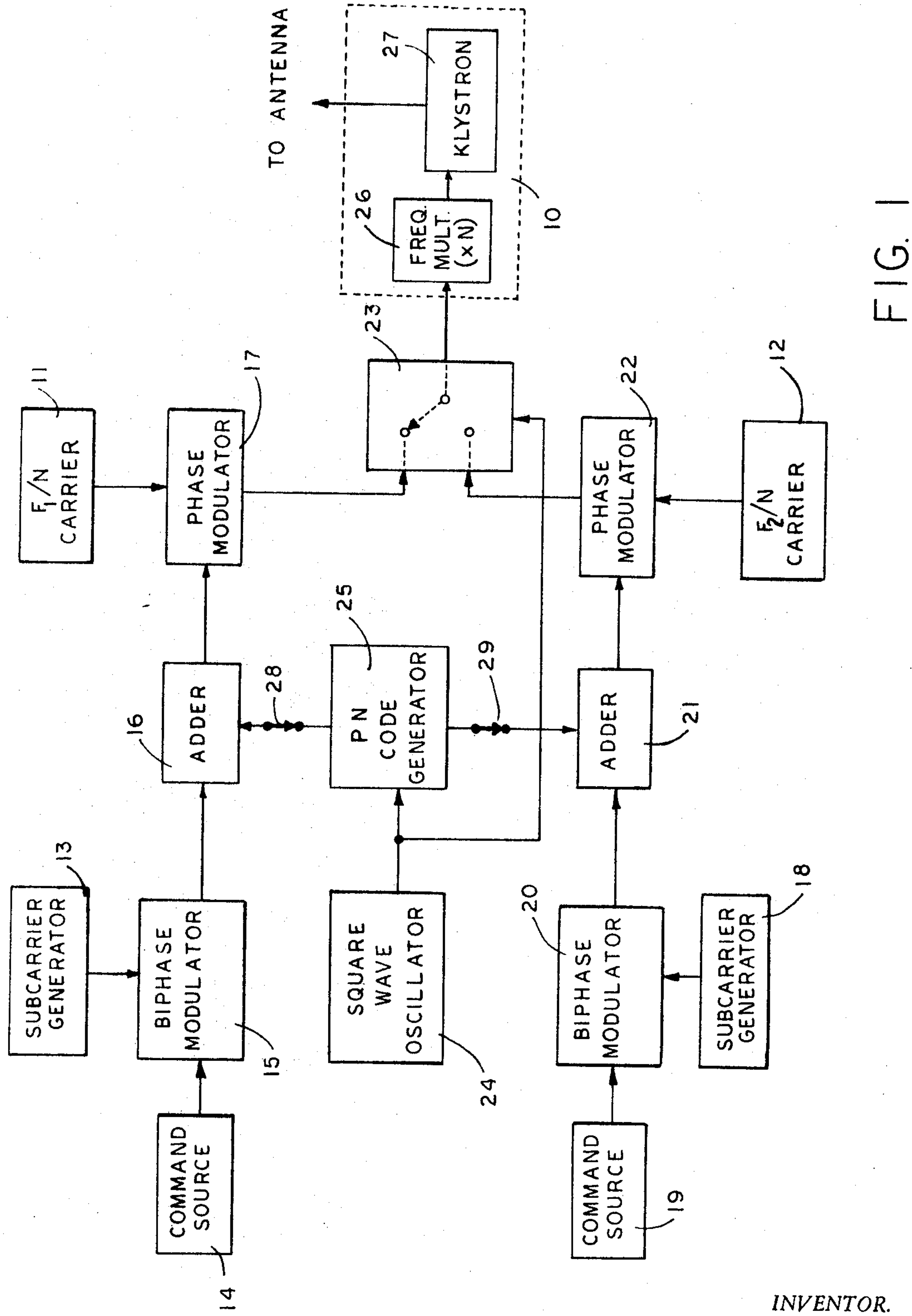
FIG. 1 is a schematic diagram illustrating an embodiment of the present invention for two carriers transmitted by a single transmitter.

Referring to FIG. 1, an embodiment is shown for transmitting two carriers from a single transmitter 10 operating at full power, where the carriers are completely independent, and each may be adjusted, modulated, or even turned off without affecting the other. The basic idea is to time share the transmitter between the two carriers by switching back and forth between them.

If the switching is arranged so that each carrier is transmitted 50 percent of the time, each carrier will have 25 percent of the power. The rest of the power will be in switching sidebands about each carrier at the odd harmonics of the switching frequency, as shown by the power spectrum in FIG. 2 for the carriers at frequencies $F_1$ and $F_2$. Additional carriers may be added by time sharing among all carriers. For example, three carriers may be transmitted, one with 25 percent of the power by alternating it with each of the other two. Each of the others is transmitted with 12.5 percent of the power. Alternatively, all three may share equally the available power by switching to each in sequence at the switching rate selected.

If the switching frequency is chosen to be high compared to the bandwidth of any tracking loops, and high compared to the data rate, but low compared to the ranging modulation and different from the command subcarrier, there will be no interferences due to the switching sidebands. The selection of a switching rate relative to subcarriers is thus similar to selection of two noninterfering telemetry subcarriers in any system, and therefore well within the skill of those working in the field to which the invention pertains. There is a possibility of a carrier tracking loop locking on a switching sideband, but the probability may be made very small in the selection of the switching frequency. For example, by switching at a PN code rate, the switching sidebands would be spread and there would be no strong signals sufficiently close to the carriers for the tracking loop to lock on. However, the spread spectrum might cause some degradation of tracking loop performance by putting some of the sideband energy into the loop bandwidth. Consequently, the best selection for the switching rate is the PN code rate during the acquisition phase, and a more optimum switching rate thereafter, except while ranging, as will be more fully explained hereinafter.

This system has a 50 percent efficiency independent of the modulation on either carrier. Thus it will provide two 100 KW carriers from a 400 KW transmitter. Should the system be extended to any number $n$ of carriers, all independent, the efficiency is $100 \times 1/n$ percent. If the separate carriers are presented to the transmitter alternately by switching between them, they do not interact in the transmitter.

The system illustrated in FIG. 1 is for the transmission of two 100 KW carriers at the frequencies $F_1$ and $F_2$. The first carrier is originated by a generator 11 at a frequency $F_1/N$ while the second generator is originated at a frequency $F_2/N$ by a generator 12. The first carrier is phase modulated by a subcarrier from a generator 13 which is in turn modulated by a command pulse code from a source 14 through a biphase modulator 15 in a conventional manner. An adder 16 couples the command modulated subcarrier to a phase modulator 17. Similarly, a subcarrier from a generator 18 is modulated by a command pulse code from a source 19 through a biphase modulator 20 coupled by an adder 21 to a phase modulator 22. Two carriers at frequencies $F_1/N$ and $F_2/N$, each separately modulated by command modulated subcarriers, are thus presented to a switching module 23.

The switching module is represented schematically by a single-pole, double-throw switch, but it is to be understood to be an electronic switch for high speed switching at a frequency in the order of 0.5 MHz. Suitable noise-free switching circuits can be constructed using two PIN diodes connecting the modulated carriers to the transmitter by output buffer diodes. The junctions between the PIN diodes and the buffer diodes are connected to a stable squarewave oscillator 24 such that only one PIN diode is forward biased at a time to transmit one of the modulated carriers during one half cycle, and the other of the modulated subcarriers during the other half cycle. However, any other switching circuit may be used, such as the two-transistor a-c switch described by R. L. Bright in AIEE Transactions, Communications and Electronics, Vol. 74, Pt. 1, March 1955 at pages 111, 121.

Figure 2:
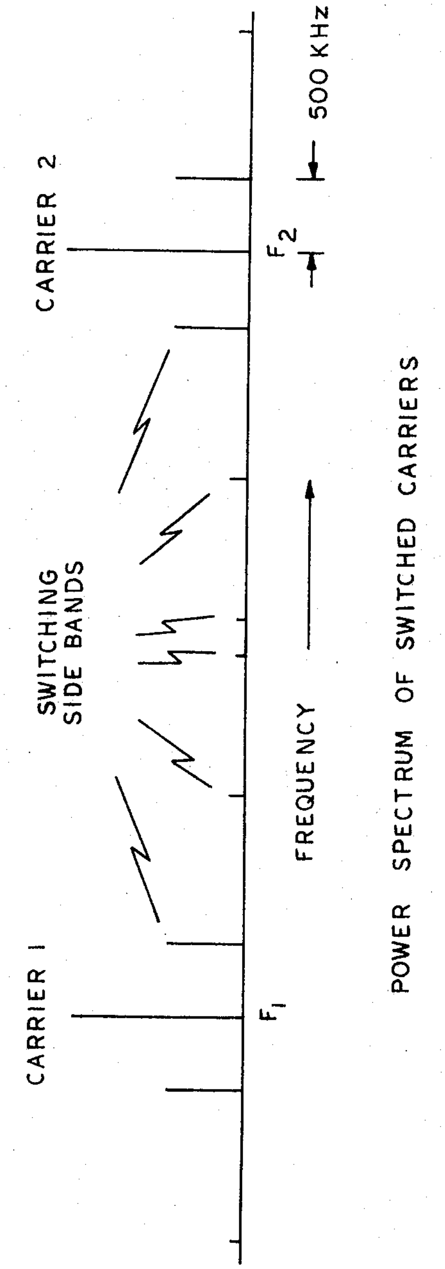
FIG. 2 illustrates the power spectrum of the two carriers as transmitted by the system of FIG. 1 but omitting the modulations of the two carriers that carry the information in the interest of clarity in the drawing.

Since each modulated carrier is thus, in effect, turned off and on at the frequency of the oscillator 24, the resulting spectrum for the composite signal at the output of the transmitter is as shown in FIG. 2 for the case of neither carrier modulated. The carriers $F_1/N$ and $F_2/N$ are both multiplied by N in the transmitter 10, as indicated by a block 26 labeled frequency multiplier (xN) connected to a klystron 27. If both signals are modulated by data modulated subcarriers, as described with reference to FIG. 1, and if the subcarrier frequencies are low compared to the switching rate of 0.5 M Hz, the resulting spectrum includes two carriers as before, each modulated by its own subcarrier and with a form exactly as though only that one carrier were being transmitted, i.e. with a form independent of the presence or absence of the other carrier. Only the switching sidebands of the carrier present will appear. In either the modulated or unmodulated case, each carrier has half of 50 percent of the transmitter power. The other 50 percent of the power will be in the sidebands about each carrier at the odd harmonics of the switching frequency.

The adders 16 and 21 are provided to add to the respective subcarriers PN codes from a code generator for signal correlation and ranging. The PN code generator clock is derived directly from the squarewave generator 24 so that switching occurs in the module 23 in synchronism with the PN code being transmitted in either of the carriers $F_1/N$ and $F_2/N$. In that manner, a PN code is received at a given ground station without distortion even though only every other bit is received in sequence for the reason that the number of bits in the code is odd, and the code is repeated a sufficient number of times to permit correlation. Thus, to avoid interference, the switching signal from the oscillator 24 is used as the ranging clock, i.e. as the synchronizing clock for the PN code generator 25. This allows the receiving station to effectively identify the PN code and respond as though the carrier were being transmitted continuously.

As noted hereinbefore, this choice of a switching rate is similar to the problem of choosing two noninterfering telemetry subcarriers, and there is a possibility of a receiver tracking loop locking to a switching sideband during the carrier acquisition phase, but it is very unlikely if a reasonably high switching frequency is used, one high enough to avoid interfering with even the harmonics of the subcarriers. Such a switching frequency is the PN code rate.

When it is required that commands and a PN ranging code be transmitted simultaneously, the modulated subcarrier and the PN ranging code are added in an adder, such as the adder 16. A switch 28 is provided to selectively add the PN code without interfering with the addition of a PN code in the adder 21. A switch 29 is similarly provided to selectively add the PN code in the mixer 21. While adding the PN code to a given subcarrier, proper relative values are selected to allocate the modulation power between them as desired. The sum is then used to phase modulate the carrier. The spectrum of a modulated carrier is essentially the same as without PN code modulation.

The following analysis of a range code modulated carrier demonstrates the feasibility of this invention when the switching signal and the ranging clock are at the same frequency and in phase. For simplicity, the ranging code may be represented as PN *cos $\omega t$, where *cos $\omega t$ is a "square cosine," i.e. is a square wave with a phase such that its zero crossovers occur at the same instants as those of a cosine wave of the same frequency. The modulated carrier is then $$\cos [(\omega_0 t) + \phi PN \text{*}\cos (\omega t)]$$

and the switched carrier is $$[½+½ \text{*}\cos (\omega t)] \cos [(\omega_0 t) + \phi\ PN\text{*}\cos \omega t)]$$

where $(\omega_0 t)$ is the carrier frequency and $(\omega t)$ is the ranging code and switching frequency. The ½ term produces the desired carrier, i.e.

$$½ \cos [(\omega_0 t) + \phi\ PN \text{*}\cos (\omega t)]$$

Since binary phase modulated waveforms can be broken into in-phase and quadrature parts, this can also be written as $$½ \cos \phi \cos(\omega_0 t) + ½ \sin \phi\ PN \text{*}\cos(\omega t) \sin (\omega_0 t).$$

The sideband term is ½ *cos $(\omega t) \cos [\omega_0 t)+\phi\ PN$*cos $(\omega t)]$.

Again breaking the carrier into its in-phase and quadrature parts, this sideband term becomes $$½\text{*}\cos(\omega t) [\cos \phi \cos(\omega_0 t)+ \sin \phi\ PN\text{*}\cos(\omega t)\sin(\omega_0 t)]$$

This may be rewritten as $$½ \cos \phi \text{*}\cos(\omega t) \cos (\omega_0 t)+½ \sin\phi \text{*}\cos(\omega t)\ PN\text{*}\cos(\omega t)\sin(\omega_0 t)$$

But since *cos$(\omega t)$ *cos $(\omega t)$=1, the sidebands are ½ cos$\phi$*cos$(\omega t)$ cos $(\omega_0 t)$ + ½ sin $\phi$ PN sin $(\omega_0 t)$. Altogether there are four terms in he transmitted signal in one carrier as follows:

$$\overbrace{1/2 \cos \phi \cos(\omega_0 t)}^{A} + \overbrace{1/2 \sin \phi\ \text{PN} \text{*}\cos (\omega t) \sin (\omega_0 t)}^{B}$$
$$+\underbrace{1/2 \cos \phi \text{*}\cos (\omega t) \cos (\omega_0 t)}_{C} + \underbrace{1/2 \sin \phi\ \text{PN} \sin (\omega_0 t)}_{D}$$

For discussion, the terms are hereinafter called terms A, B, and D as shown. Term A is the only unmodulated carrier component; all of the others are biphase modulated either at a high frequency (term C) or with a broad spectrum (terms B and D). Therefore, the receiving station will track term A.

Term C will produce a clock output from the phase detector in a carrier tracking loop, but it will be rejected by the loop filter, so term C will be disregarded. Or perhaps term C will be removed by the IF filter preceding the phase detector in the receiver. In any case, it is not used by the receiver and does not interfere.

Terms B and D will each be detected by the ranging detector in the receiving station and pass through the ranging channel. The detected signals will be PN *cos $(\omega t)$ and PN. Each of those terms has an amplitude of ½ sin $\phi$ so that the output of the detector is a sum of two equal amplitude binary waves. Such a sum has three values +2, 0, and −2. In the weak signal case, the limiter in the ranging channel suppresses a binary signal 2 db. When this composite signal has a value ±2, it is suppressed 2 db. Since the signal plus noise at the output of the limiter is essentially equal to the noise, the noise level does not change when the signal has the value 0. Thus the composite signal is suppressed 2 db, and each component is also suppressed by 2 db. In the strong signal case the situation is more complex, but since there is more signal to operate on, proper tracking will be achieved.

The receiving station detects the composite binary wave and presents it to the ranging channel. Since there is zero crosscorrelation between PN and PN *cos $(\omega t)$, the ranging channel in the receiver will respond only to the desired signal, namely PN *cos $(\omega t)$. More generally, if the ranging code is represented by RC, then the two signals are RC and RC *cos $(\omega t)$ with zero crosscorrelation.

Although particular embodiments of the invention have been described and illustrated, it is recognized that other embodiments for producing two or more carriers from one transmitter by switching between them may readily occur to those skilled in the art. Consequently, it is intended that the claims be interpreted to cover such other embodiments.

What is claimed is:

1. A multicarrier communication system comprising a transmitter, means for generating a clock signal, means for producing a plurality of independently modulated carrier signals, and means for cyclically switching to said transmitter each of said carrier signals in response to said clock signal, said means for producing said plurality of independently modulated carrier signals for each carrier signal comprising separate means for producing a subcarrier signal, means for biphase modulating said subcarrier signal with a unique data signal, wherein a pseudonoise code is added to said subcarrier, including means synchronized by said clock signal for generating said pseudonoise code in phase with the switching of said switching means, and means for adding said pseudonoise to said subcarrier, means for producing a carrier signal at a unique frequency, and means for phase modulating said carrier signal with said modulated subcarrier signal.

2. A multicarrier communications system as defined in claim 1 wherein said carrier signal for each modulated carrier is at a frequency equal to a desired carrier frequency divided by a number N, and said transmitter includes means for multiplying by said number N the frequencies of all modulated carriers transmitted.

* * * * *